US009065822B2

(12) United States Patent
Andersen

(10) Patent No.: US 9,065,822 B2
(45) Date of Patent: Jun. 23, 2015

(54) AUTHENTICATING DEVICES FOR COMMUNICATIONS

(75) Inventor: Carsten Bukholdt Andersen, Gistrup (DK)

(73) Assignee: Cambridge Silicon Radio Limited, Cambridge (GB)

( * ) Notice: Subject to any disclaimer, the term of this patent is extended or adjusted under 35 U.S.C. 154(b) by 1730 days.

(21) Appl. No.: 12/000,006

(22) Filed: Dec. 6, 2007

(65) Prior Publication Data

US 2008/0150681 A1 Jun. 26, 2008

(30) Foreign Application Priority Data

Dec. 8, 2006 (GB) .................................. 0624571.6

(51) Int. Cl.
G06F 17/30 (2006.01)
H04L 29/06 (2006.01)
H04W 12/06 (2009.01)
H04M 1/60 (2006.01)
H04W 88/02 (2009.01)

(52) U.S. Cl.
CPC .......... H04L 63/0853 (2013.01); H04M 1/6066 (2013.01); H04M 2250/02 (2013.01); H04W 12/06 (2013.01); H04W 88/021 (2013.01)

(58) Field of Classification Search
CPC ....................................................... H04W 4/12
USPC ................. 726/2, 19, 1, 3; 713/165
See application file for complete search history.

(56) References Cited

U.S. PATENT DOCUMENTS

| 7,802,297 | B2 * | 9/2010 | Bennett et al. ................... 726/19 |
| 7,899,325 | B2 * | 3/2011 | Dickson et al. .................. 398/40 |
| 8,112,794 | B2 * | 2/2012 | Little et al. ......................... 726/9 |
| 8,116,685 | B2 * | 2/2012 | Bregman-Amitai et al. 455/41.2 |
| 8,446,364 | B2 * | 5/2013 | Solomon ........................ 345/156 |
| 8,521,738 | B2 * | 8/2013 | Child ............................. 707/736 |
| 2002/0044690 | A1 * | 4/2002 | Burgess ........................ 382/209 |
| 2002/0080967 | A1 * | 6/2002 | Abdo et al. .................... 380/270 |
| 2003/0065918 | A1 * | 4/2003 | Willey .......................... 713/168 |
| 2005/0009469 | A1 * | 1/2005 | Kotola .......................... 455/41.2 |
| 2005/0273356 | A1 * | 12/2005 | Holoubek ......................... 705/1 |
| 2006/0025211 | A1 * | 2/2006 | Wilday et al. ................... 463/27 |
| 2006/0203083 | A1 * | 9/2006 | Wilson et al. .............. 348/14.02 |
| 2007/0123165 | A1 * | 5/2007 | Sheynman et al. .......... 455/41.2 |
| 2008/0134281 | A1 * | 6/2008 | Shinde et al. ..................... 726/1 |
| 2010/0043056 | A1 * | 2/2010 | Ganapathy ....................... 726/2 |
| 2012/0223883 | A1 * | 9/2012 | Solomon ....................... 345/157 |
| 2012/0231821 | A1 * | 9/2012 | Swanson ....................... 455/466 |

* cited by examiner

Primary Examiner — Abu Sholeman
(74) Attorney, Agent, or Firm — Vorys, Sater, Seymour and Pease LLP; Vincent M DeLuca

(57) ABSTRACT

A controller for a communications device having a memory storing data specifying user instructions; and a communications controller arranged for receiving a request of a preformed format for the data from a second device and in response to the request transmitting the data to the second device. The user instructions are arranged for use by a user on the first device to authenticate the second device with the first device.

43 Claims, 2 Drawing Sheets

AUTHENTICATING DEVICES FOR COMMUNICATIONS

FIELD OF INVENTION

The present invention relates to authenticating one user device with another device for communications, particularly for wireless communications.

BACKGROUND TO THE INVENTION

An increasing number of devices are incorporating wireless radio communications systems, such as a short range wireless system called Bluetooth. Examples of these devices include wireless headsets, mobile phones, laptop computers, wireless mice and PDAs.

One advantage of wireless communication systems is the ability to connect a first user device to a second interdependent device, such as connecting a headset to a handset for a telecommunications system. To ensure the first user device can communicate with the second interdependent device without interception it is desirable to establish a secure communications connection.

The secure connection of two devices using Bluetooth is called pairing. Each device in a pair automatically accepts communication from the other device, bypassing the discovery and authentication process.

Existing methods for pairing devices can be complex. Often the user forgets exactly how to pair the two devices. This results in support calls to the retailer and/or manufacturer. This is an undesirable situation for both the user and the retailer/manufacturer.

Instead of calling for support the user can also read the device manual or access an online database. However, manuals are frequently lost or not readily available, and in relation to online databases, the user may not have ready access to the internet at the time of pairing and users may become frustrated if they are forced to search for pairing instructions online whenever they wish to pair devices.

It is an object of the present invention to provide a method for the authentication of user devices which is easy to use and overcomes the disadvantages of above methods, or to at least provide a useful alternative.

SUMMARY OF THE INVENTION

According to a first aspect of the invention there is provided a controller for a communications device comprising:

a memory storing data specifying user instructions; and a communications controller arranged for receiving a request of a preformed format for the data from a second device and in response to the request transmitting the data to the second device;

wherein the user instructions are arranged for use by a user on the first device to authenticate the second device with the first device.

The first device may communicate with the second device over a wireless channel.

The data may be a code corresponding to user instructions within an externally stored database. The database may be stored on the second device. Alternatively, the database may be accessible over the internet.

Preferably, the controller includes an RF transceiver arranged for receiving the request and transmitting the data for the communications controller.

The communications controller may be arranged for receiving the request only when the first device is placed into a receptive mode.

The data may be text of the user instructions.

The user instructions may be arranged for use by the user to apply the instructions on the first device through a keypad.

It is preferred that the data is arranged for the second device to generate the user instructions from the data. The data may be arranged for the second device to generate the user instructions by converting the data into an audio sample of the user instructions. The data may be arranged for the second device to generate the user instructions by combining the data with additional data.

The user instructions may be arranged for use by a user on the first device to authenticate the second device with the first device for communications and/or cooperation.

The user instructions may be are arranged for use by a user on the first device to authenticate the second device with the first device for wireless communications. The wireless communications may be RF communications. The RF communications may be Bluetooth communications.

The user instructions may be arranged for use by the user on both the first and second devices.

The first device may be arranged to transmit the data automatically in response to the request.

According to a further aspect of the invention there is provided a controller for a communications device comprising:

a communications controller arranged for transmitting a preformed request for data specifying user instructions and for receiving the data transmitted from a second device in response to the request;

a processor arranged for generating the user instructions from the received data; and a user output device arranged for outputting the generated user instructions;

wherein the user instructions are arranged for use by a user on the second device to authenticate the first device with the second device.

The first device may communicate with the second device over a wireless channel.

The data may be a code corresponding to user instructions within an externally stored database. The database may be stored on the first device. Alternatively, the database may be accessible over the internet.

The processor may be arranged to generate the user instructions by correlating the code with the user instructions stored within the database.

The controller may include an RF transceiver arranged for transmitting the request and receiving the data for the communications controller.

The data may be text of the user instructions.

The user instructions may be arranged for use by the user to apply the instructions on the second device through a keypad.

The processor may be arranged for generating the user instructions by converting the data into an audio sample of the user instructions.

The data may be arranged for the second device to generate the user instructions by combining the data with additional data.

The first and second devices may be authenticated for communications and/or cooperation.

The first device and second device may be authenticated for wireless communications. The first device and second device may be authenticated for RF communications. The first device and second device may be authenticated for Bluetooth communications.

The user instructions may be arranged for use by the user on both the first and second devices.

The user output device may be a speaker. The user output device may be a visual display.

According to a further aspect of the invention there is provided a communications system comprising:

a first and second device;

a first controller for the first device which stores data specifying user instructions for authenticating the second device with the first device, the first controller arranged for receiving a preformed request for the data from the second device, and in response to the request transmitting the data to the second device; and a second controller for the second device arranged for requesting the data from the first device, receiving the data from the first device, processing the data to generate user instructions for authenticating the first device with the second device, and outputting the user instructions to a user;

wherein the user instructions are arranged for use by a user on the first device.

According to a further aspect of the invention there is provided a method for authenticating a first device with a second device for communications, comprising the steps of:

requesting data relating to user instructions for authenticating the second device with the first device from the first device;

transmitting the data to the second device;

generating user instructions from the received data;

outputting the user instructions using a user interface; and authenticating the first device and second device by applying the user instructions on the first device.

According to a yet further aspect of the invention there is provided a controller for a communications device comprising:

a memory storing data specifying user instructions; and a communications controller arranged for transmitting the data periodically;

wherein the user instructions are arranged for use by a user on the first device to authenticate the second device with the first device.

BRIEF DESCRIPTION OF THE DRAWINGS

Embodiments of the invention will now be described, by way of example only, with reference to the accompanying drawing in which.

DETAILED DESCRIPTION OF PREFERRED EMBODIMENTS

The present invention provides a method for authenticating a first device with a second device for wireless communications. The first device stores data that defines a set of instructions that can be interpreted by a user and which define a set of steps for establishing a paired connection between the devices. When it is desired to establish a paired connection, the first device transmits those instructions to the second device and the second device plays the instructions by means of its user interface (e.g. by audio or visual means) to a user. The user can then follow the instructions in order to connect the devices to each other. In effect the first device is acting as a server to the second device as a client to provide the second device with information required to pair the second device with the first device.

The invention will now be described with reference to the pairing of two Bluetooth devices. However, it will be appreciated that, with minor modification, the method can be used for the authentication of any devices for inter-device communication or cooperation.

Figure 1:
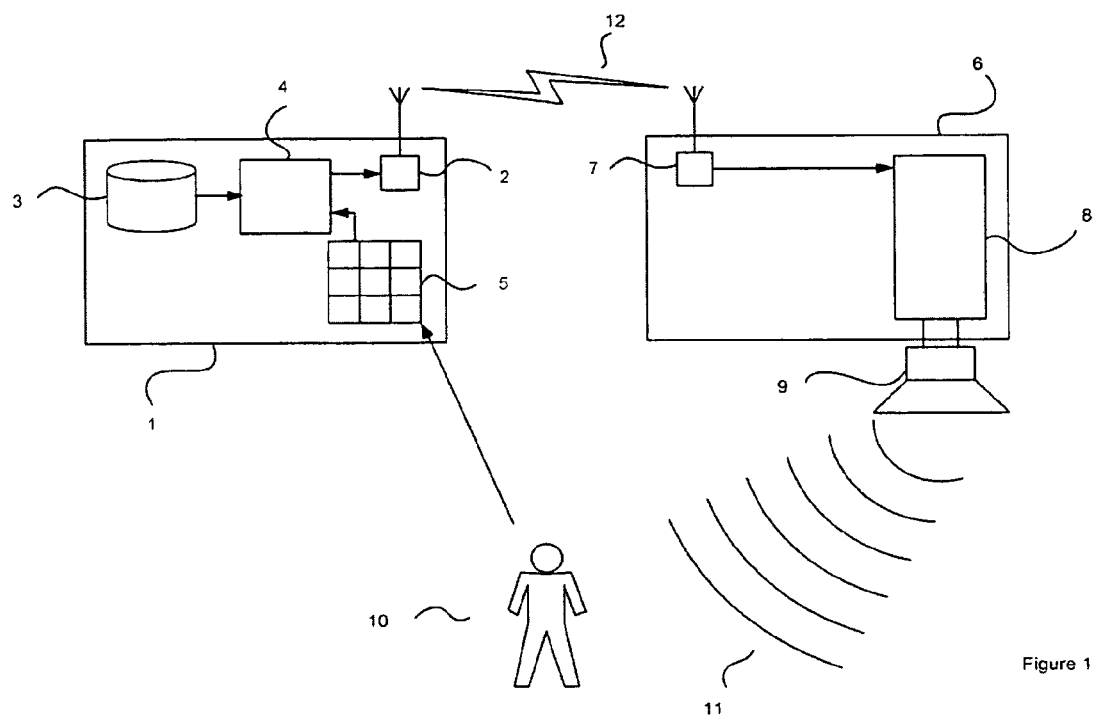
FIG. 1: shows a schematic diagram illustrating an embodiment of the invention in use.

FIG. 1 shows a first device 1 with an RF (radio frequency) transceiver 2. The device 1 includes a memory 3. The first device 1 includes a processor 4 connected to the memory 3 and the RF transceiver 2. The first device 1 also includes a user interface 5 connected to the processor 4.

A second device 6 is also shown which includes an RF transceiver 7 connected to a processor 8. The second device 6 also includes a user output device 9, such as a speaker or a display. The processor 8 is connected to the user output device 9.

It will be appreciated that the components of the first and/or second device noted above may be embodied within a communications controller for a device. It will further be appreciated that the processors 4 and 8 may be considered as communications controllers singly in combination with the transceiver.

In this example, the first device 1 is a mobile handset and the second device 6 is a headset. The user output device 9 of the second device 6 is the earpiece of the headset. However, it will be appreciated that the user output device 9 could be any user output device such as a visual display.

An embodiment of the invention will now be described.

The memory 3 of the first device 1 stores data related to user instructions.

The instructions provide a step-by-step method for a user to pair any second device with the first device 1. The data could be stored as text of those instructions.

Alternatively, the data could be stored as a list of codes—each code corresponding to an instruction step towards pairing the devices, with the text or other user-intelligible data defining those steps being stored in memory of the second device. Instead of the instructions being stored in a text format they could be stored in other ways, for example as an audio or video sample of the instructions for pairing.

The processor 4 of the first device 1 is configured for extracting the data from the memory 3 and transmitting it to the second device 6 using the RF transceiver 2 of the first device 1.

The user interface 5 of the first device 1 is configured to receive input from a user 10 following the instructions to initiate and/or complete the authentication procedure.

The processor 8 of the second device 6 is configured for requesting data relating to user instructions from the first device 1 and for converting the data received in response into a form suitable for output to a user through the user output device 9.

To pair the two devices 1 and 6 the user 10 first ensures that the first device 1 is placed into a mode such that it is receptive to requests from other devices to pair with it. For example, in relation to Bluetooth devices, the device will be placed into inquiry scan mode. The device may enter this mode by default.

When the second device 6 is switched on, or otherwise activated, it connects to a nearby device (in this example the first device) and transmits to this device a request for data relating to user instructions of how to pair a device with this device. The request is in the form of a message. For compatibility reasons, this message is preferably of a standard format in order that a wide range of devices may be able to recognise the message.

In response to the message, the first device 1 automatically transmits the data defining the steps that it has stored in memory 3 to the second device 6.

The second device 6 receives the data and uses the processor 8 to generate user instructions for output through the user output device 9. For example, if the data is text and the output device 9 is a speaker, the processor 8 uses a text-to-speech engine which converts the text into an audio sample played 11 to the user 10 through the speaker 9. Alternatively, if the output device is a visual display, the processor 8 can convert the text for display on the visual display.

It will be appreciated that the processor 8 may utilise additional information stored on the second device 6 to convert the data into user instructions for output, such as partial audio samples for compositing an audio sample from the text or a database of user instruction steps corresponding to a list of codes transmitted by the first device 1. If the data is a set of codes that correspond to instructional steps then the processor 8 retrieves the instructional steps indicated by the codes from its local memory and replays them to the user in an appropriate way.

In one embodiment the processor 8 generates the user instructions from the data received from the first device and information stored on the second device. In this embodiment the information stored on the second device relates to user instructions which are to be applied on the second device.

The user instructions are thus outputted by the user output device (in this example the speaker).

The user follows the instructions to initiate and/or complete the pairing process between the two devices by applying the instructions on a user interface, such as a keypad or a keypad and visual display, on the first device. Where the user instructions include steps for application on the second device, the second device may include a user interface. The instructions can include steps such as which buttons to press on the keypad(s) of the devices, or which option(s) to choose as displayed on a visual display.

In an alternative embodiment the data stored on the first device is a reference code for that type of device which correlates to a set of user instructions for pairing that device with other devices within an externally stored database. The second device uses the reference code it receives from the first device to query the external database to retrieve the appropriate pairing instructions. The external database could be remote from the devices. It could be accessed by the second device over a network such as the internet.

The two devices conveniently communicate with each other over a wireless cation channel 12.

The communication of instructional data could be initiated in other ways than that described above. For example, the communication could be initiated by the user activating the first device in such a way that it is capable of pairing with other devices. On entering that state the device could repeatedly communicate the instructional data automatically for a period of time, in order that it can be received by the second device.

The instructional data could include a code to which the first device is responsive to permit another device to pair with it. In this situation, the code could then be communicated to the user when the instructions are presented, the user could enter the code into the second device, and the second device could then transmit that code to the first device when communicating with it to perform the operation of pairing.

The first device could store instructions in a number of languages. If the transmission of the instruction data is performed in response to a message from the second device, that message could include data that identifies a language for which the user interface of that device is currently set, and in dependence on that information the first device could transmit the appropriate set of instruction data to the second device.

The full set of steps required to pair the devices could be dependent on the nature of both devices. To provide the user with a full set of instructions the second device could combine the instructions defined by the data it receives from the first device with instructions it stores locally (or with further instructions that it downloads from a remote location) defining steps that are dependent on the nature of the second device so as to provide the user with a set of instructions that covers all the steps needed to perform the pairing.

Figure 2:
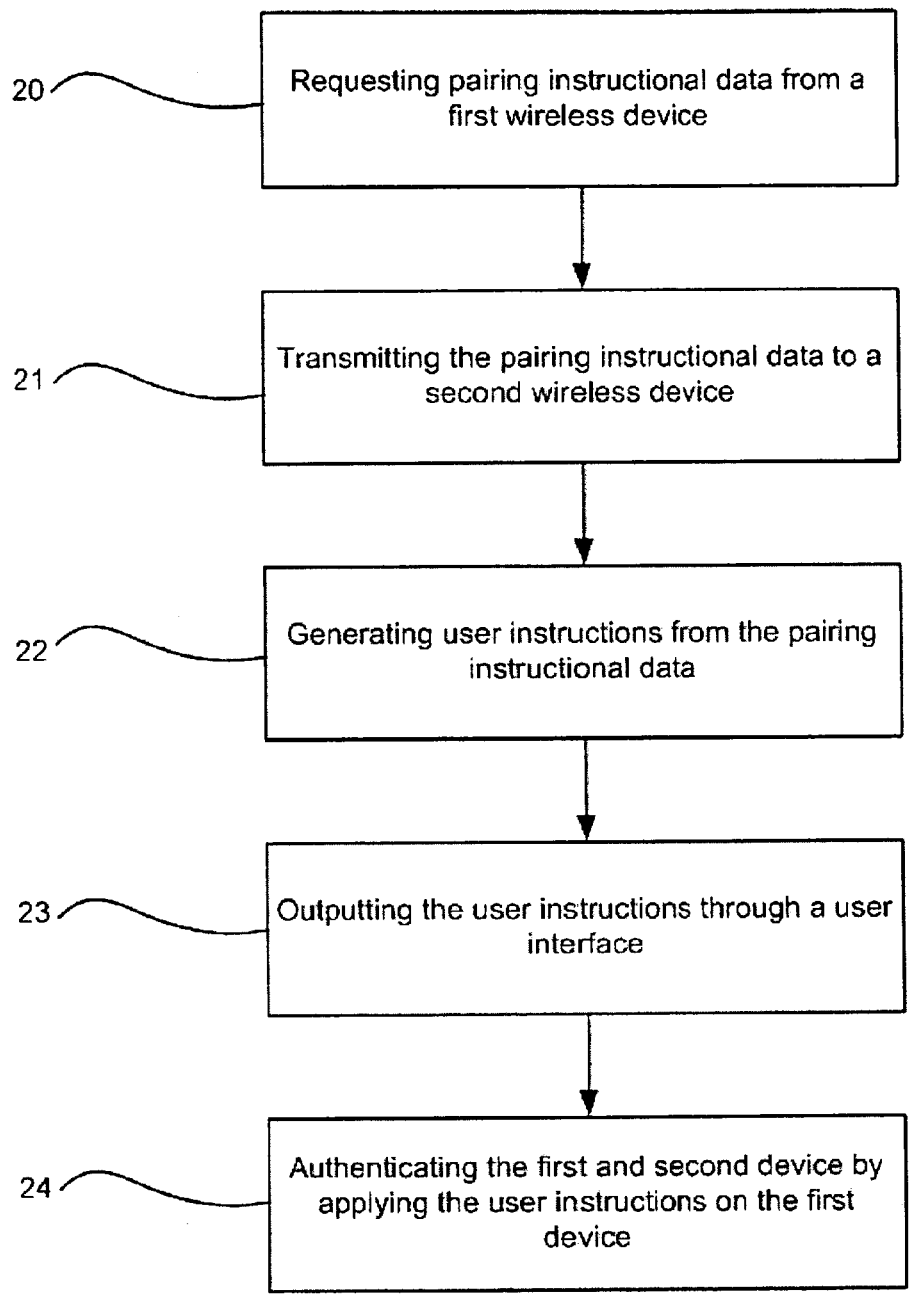
FIG. 2: shows a flow diagram in accordance with an embodiment of the invention.

An embodiment of the invention will now be described with reference to FIG. 2.

In step 20, pairing instruction data is requested from a first wireless device by a second wireless device.

In step 21, the pairing instruction data is transmitted by the first wireless device.

In step 22, user instructions are generated from the pairing instruction data.

In step 23, the user instructions are outputted via a user interface from the second wireless device.

In step 24, the user instructions are applied by a user on the first wireless device pair or begin pairing the first wireless device with the second wireless device.

Taking as an example the situation where the first device is a mobile phone and the second device is a wireless headset, the steps that are performed could be as follows:
1. User presses button on mobile phone to put it into inquiry scan mode.
2. User activates the wireless headset by pressing a pairing button.
3. The wireless headset transmits message by radio to elicit instructional information from nearby devices.
4. Mobile phone receives message and returns by radio the pairing instruction data that it stores to the headset in a text format.
5. Headset converts the instructions from text to speech and plays to the user, using the headset speakers, step by step instructions on how the user can perform the pairing operation.

One potential advantage of embodiments of the present invention is that the user of a communications device can authenticate it with any other suitable communications device without requiring another resource, such as being forced to contact the retailer/manufacturer, access an online database or read the manual. This is particularly advantageous when the first device has no user output means (e.g. a display or speaker) itself that can communicate instructions to a user, since such a device has no means of directly providing a user with information on how to pair with it. Of course, some such devices may have individual LEDs (light emitting diodes) or the like for signalling status information, but those are not capable of communicating instructions.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A controller for a second communications device, comprising:
 a memory storing data that relates to a set of instructions, said instructions being provided for interpretation and performance by a user; and
 a communications transceiver arranged for receiving a request of a preformed format for the data relating to user instructions from a first communications device and in response to the request transmitting the data relating to user instructions to the first communications device;
  wherein the first communications device generates the instructions from the data relating to user instructions transmitted from the second communications device, the instructions being arranged for use by a user on the second communications device to authenticate the first communications device with the second communications device, wherein said user instructions comprise a visual display or audio output of a pairing step.

2. A controller as claimed in claim 1 wherein the second communications device communicates with the first communications device over a wireless channel.

3. A controller as claimed in claim 1 wherein the data is a code corresponding to user instructions within an externally stored database.

4. A controller as claimed in claim 3 wherein the database is stored on the first communications device.

5. A controller as claimed in claim 3 wherein the database is accessible over the internet.

6. A controller as claimed in claim 1 wherein the transceiver is an RF transceiver arranged for receiving the request and transmitting the data.

7. A controller as claimed in claim 1 wherein the controller is arranged for receiving the request only when the second communications device is placed into a receptive mode.

8. A controller as claimed in claim 1 wherein the data is text of the instructions.

9. A controller as claimed in claim 1 wherein the instructions are arranged for use by the user to apply the instructions on the second communications device through a keypad.

10. A controller as claimed in claim 1 wherein the data is arranged for the first communications device to generate the instructions from the data.

11. A controller as claimed in claim 1 wherein the data is arranged for the first communications device to generate the instructions by converting the data into an audio sample of the instructions.

12. A controller as claimed in claim 1 wherein the data is arranged for the first communications device to generate the instructions by combining the data with additional data.

13. A controller as claimed in claim 1 wherein the instructions are arranged for use by a user on the second communications device to authenticate the first communications device with the second communications device for communications and/or cooperation.

14. A controller as claimed in claim 1 wherein the instructions are arranged for use by a user on the second communications device to authenticate the first communications device with the second communications device for wireless communications.

15. A controller as claimed in claim 14 wherein the wireless communications are RF communications.

16. A controller as claimed in claim 15 wherein the RF communications are Bluetooth communications.

17. A controller as claimed in claim 1 wherein the instructions are arranged for use by the user on both the first and second communications devices.

18. A controller as claimed in claim 1 wherein the second communications device is arranged to transmit the data automatically in response to the request.

19. A controller for a first communications device, comprising:
 a communications transceiver arranged for transmitting a preformed request for data relating to user instructions and for receiving the data relating to user instructions transmitted from a second communications device in response to the request, wherein the data relating to user instructions is stored in a memory of the second communications device and the instructions are provided for interpretation and performance by a user;
 a processor arranged within the first communications device, for generating the instructions from the received data relating to user instructions; and
 a user output device arranged for outputting the generated instructions;
  wherein the instructions are arranged for use by a user on the second communications device to authenticate the first communications device with the second communications device, and wherein the user instructions comprise a visual display or audio output of a pairing step.

20. A controller as claimed in claim 19 wherein the first communications device communicates with the second communications device over a wireless channel.

21. A controller as claimed in claim 19 wherein the data is a code corresponding to user instructions within an externally stored database.

22. A controller as claimed in claim 21 wherein the database is stored on the first communications device.

23. A controller as claimed in claim 21 wherein the database is accessible over the internet.

24. A controller as claimed in claim 21 wherein the processor is arranged to generate the instructions by correlating the code with the user instructions stored within the database.

25. A controller as claimed in claim 19 wherein the communications transceiver comprises an RF transceiver arranged for transmitting the request and receiving the data for the controller.

26. A controller as claimed in claim 19 wherein the data is text of the instructions.

27. A controller as claimed in claim 19 wherein the instructions are arranged for use by the user to apply the instructions on the second device through a keypad.

28. A controller as claimed in claim 19 wherein the processor is arranged for generating the instructions by converting the data into an audio sample of the instructions.

29. A controller as claimed in claim 19 wherein the data is arranged for the second communications device to generate the instructions by combining the data with additional data.

30. A controller as claimed in claim 19 wherein the first and second communications devices are authenticated for communications and/or cooperation.

31. A controller as claimed in claim 19 wherein the first communications device and second communications device are authenticated for wireless communications.

32. A controller as claimed in claim 19 wherein the first communications device and second communications device are authenticated for RF communications.

33. A controller as claimed in claim 19 wherein the first communications device and second communications device are authenticated for Bluetooth communications.

34. A controller as claimed in claim 19 wherein the instructions are arranged for use by the user on both the first and second communications devices.

35. A controller as claimed in claim 19 wherein the user output device is a speaker.

36. A controller as claimed in claim 19 wherein the user output device is a visual display.

37. A communications system comprising:
first and second communications devices;
a second controller for the second communications device which stores data relating to user instructions for authenticating the first communications device with the second communications device, said instructions being provided for interpretation and performance by a user, the second controller being arranged for receiving a preformed request for the data relating to user instructions from the first communications device, and in response to the request transmitting the data relating to user instructions to the first communications device; and
a first controller for the first communications device arranged for requesting the data relating to user instructions from the second communications device, receiving the data relating to user instructions from the second communications device, processing the data to generate the instructions within the first communications device for authenticating the second communications device with the first communications device, and outputting the instructions to a user;
wherein the instructions are arranged for use by a user on the second communications device, and wherein the user instructions comprise a visual display or audio output of a pairing step.

38. A method for authenticating a second communications device with a first communications device for communications, comprising the steps of:
requesting data relating to user instructions for authenticating the first communications device with the second communications device from the second communications device in which said data is stored, said instructions being capable of interpretation and performance by a user;
transmitting the data relating to user instructions to the first communications device;
generating instructions from the received data relating to user instructions within the first communications device;
outputting the generated instructions to a user interface of the first communications device, wherein the user instructions comprise a visual display or audio output of a pairing step; and
authenticating the second communications device and first communications device by applying the instructions on the second communications device.

39. A controller for a second communications device, comprising:
a memory storing data relating to user instructions, said instructions being capable of interpretation and performance by a user; and
a communications transceiver arranged for transmitting the data relating to user instructions periodically to a first communication device following a request for data relating to user instructions made by the first communications device, the first communications device generating the instructions upon receipt of the data relating to user instructions from the second communications device;
wherein the instructions are arranged for use by a user on the second communications device to authenticate the first communications device with the second communications device, and wherein the user instructions comprise a visual display or audio output of a pairing step.

40. A non-transitory computer readable storage medium tangibly storing a computer program that, when executed by a computer, causes at least one processor to:
request data relating to user instructions for authenticating a first communications device with a second communications device from the second communications device in which said data is stored, said instructions being capable of interpretation and performance by a user;
transmit the data relating to user instructions to the first communications device;
generate instructions from the received data relating to user instructions within the first communications device;
output the generated instructions to a user interface of the first communications device, wherein the user instructions comprise a visual display or audio output of a pairing step; and
authenticate the second communications device and first communications device by applying the instructions on the second communications device.

41. A controller as claimed in claim 19 wherein the instructions prescribe a series of acts to be taken in performing authentication or pairing as between the first and second communications devices.

42. A controller as claimed in claim 41 wherein the preformed request has a standard preformed format that is common for a plurality of different device types.

43. A controller as claimed in claim 19 wherein the preformed request has a standard preformed format that is common for a plurality of different device types.

* * * * *

UNITED STATES PATENT AND TRADEMARK OFFICE
CERTIFICATE OF CORRECTION

| | | |
|---|---|---|
| PATENT NO. | : 9,065,822 B2 | Page 1 of 1 |
| APPLICATION NO. | : 12/000006 | |
| DATED | : June 23, 2015 | |
| INVENTOR(S) | : Andersen | |

It is certified that error appears in the above-identified patent and that said Letters Patent is hereby corrected as shown below:

IN THE SPECIFICATION

In Column 1, Line 10, delete "BACKGROUND TO" and insert -- BACKGROUND OF --, therefor.

In Column 4, Line 24, delete "singly" and insert -- singly or --, therefor.

In Column 5, Line 52, delete "cation" and insert -- communication --, therefor.

In Column 6, Line 28, delete "device" and insert -- device to --, therefor.

Signed and Sealed this
Twenty-second Day of December, 2015

Michelle K. Lee
*Director of the United States Patent and Trademark Office*